United States Patent

Choi

Patent Number: 6,011,668
Date of Patent: Jan. 4, 2000

[54] METHOD AND APPARATUS FOR GAIN CALIBRATION IN A DISK DRIVE SERVO CONTROL SYSTEM AND DISK DRIVE RECORDING APPARATUS WITH GAIN CALIBRATION FUNCTION

[75] Inventor: Soo-Il Choi, Suwon, Rep. of Korea

[73] Assignee: SamSung Electronics Co., Ltd., Suwon, Rep. of Korea

[21] Appl. No.: 08/867,687

[22] Filed: Jun. 2, 1997

[30] Foreign Application Priority Data

May 31, 1996 [KR] Rep. of Korea ................. 96/19235

[51] Int. Cl.⁷ ................................................. G11B 5/596
[52] U.S. Cl. ................................ 360/78.06; 360/78.04; 360/78.07
[58] Field of Search .................... 360/78.06, 78.07, 360/78.04, 78.08, 78.09, 75

[56] References Cited

U.S. PATENT DOCUMENTS

| | | | |
|---|---|---|---|
| 3,555,252 | 1/1971 | Garden | 235/151.1 |
| 3,798,431 | 3/1974 | Schulkind et al. | 235/151.12 |
| 3,917,930 | 11/1975 | Davey et al. | 235/151.11 |
| 4,456,863 | 6/1984 | Matusek | 318/572 |
| 4,480,217 | 10/1984 | Robbins et al. | 318/618 |
| 4,890,172 | 12/1989 | Watt et al. | 360/77.04 |
| 5,189,571 | 2/1993 | Murphy et al. | 360/75 |
| 5,220,546 | 6/1993 | Fennema | 369/32 |
| 5,287,234 | 2/1994 | Suzuki | 360/78.04 |
| 5,768,045 | 6/1998 | Patton, III et al. | 360/78.06 X |

*Primary Examiner*—Andrew L. Sniezek
*Attorney, Agent, or Firm*—Robert E. Bushnell, Esq.

[57] ABSTRACT

A method of gain calibration capable of providing the better performance and stability in a servo control system of a disk drive recording apparatus (hard disk drive) by the measurement and calibration of its gain. The method includes the steps of performing a track seek operation for a given target track, applying the maximum current to the actuator thereby to repeatedly measure moving velocity of the actuator and store the measured values, calculating an average moving velocity from the stored measured values in case that a number of measurement repetition for the moving velocity of the actuator exceeds a given number of times, calculating a scaling factor according to a gain difference of the calculated average moving velocity with respect to a reference velocity stored in a memory, and generating a gain parameter by calculating a reciprocal value of the scaling factor. The reference velocity represents a moving velocity of the actuator obtained upon application of the maximum current thereto during seeking of a sample track in the manufacturing stage of the disk drive recording apparatus. The target track selected to measure the moving velocity of the actuator is adapted to be provided with an accelerating stage, a uniform velocity stage and a decelerating stage during velocity control for servo control.

29 Claims, 4 Drawing Sheets

METHOD AND APPARATUS FOR GAIN CALIBRATION IN A DISK DRIVE SERVO CONTROL SYSTEM AND DISK DRIVE RECORDING APPARATUS WITH GAIN CALIBRATION FUNCTION

CLAIM OF PRIORITY

This application makes reference to, incorporates the same herein, and claims all benefits accruing under 35 U.S.C. §119 from an application for METHOD FOR GAIN CALIBRATION OF SERVO CONTROL SYSTEM IN DISK DRIVE RECORDING APPARATUS earlier filed in the Korean Industrial Property Office on the 31st day of May 1996 and there duly assigned Ser. No. 96-19235, a copy of which application is annexed hereto.

BACKGROUND OF THE INVENTION

1. Field of the Invention

The present invention relates to servo control for a disk drive recording apparatus and more particularly to a method and apparatus for calibration of the gain for any hardware circuit components of the servo control system and to a disk drive recording apparatus having such a gain calibration function.

2. Description of the Related Art

In recent years a disk drive recording devices, and in particular hard disk drives, have been extensively used as among the most preferred data storage means for computer systems. The state of the art consequently has improved to offer higher speed for read/write operations as well as a greater data storage capacities. Accordingly, as data storage capacities for hard disk drives have increased in line with the rapid technical progress of personal computers, more precise servo control is generally necessitated to ensure operational reliability suitable for such disk drives to be used as data storage means.

A servo control system in the aforementioned hard disk drive has two principal operational modes: a seek mode and a track following mode. The seek mode is used for a read/write operation to relocate a head of the disk drive to a desired target track position, and the track following mode is used to have the head accurately follow a center course or a data line along the target track, once the head has reached the target track. Such a servo control system typically operates under velocity control until the head reaches the target track, and then it operates under position control at the target track so that the head is maintained on-track.

In the aforementioned hard disk drive, some hardware components of the servo control system, such as an analog-to-digital converter, an actuator such as a voice coil motor, an actuator driver, a digital-to-analog converter, and so forth, usually have their own offsets and gain differences. These offset and gain differences may be large or small, but it is known in the art that, when generated by such hardware elements, they have a significant influence upon the performance and stability of the entire servo control system. As will be discussed in detail below, this influence results because such gain differences, in particular, alter the velocity with which the actuator responds to a given velocity control command. Thus the actuator, in an initial or acceleration stage of a seek operation with a given stroke length, typically will attain a peak velocity different from the velocity contemplated in the design of the control system for a stroke of that length.

It is therefore appreciated that, at a given point in time within the accelerating phase, a velocity difference $\Delta V$ is attributable to the gain difference $\Delta K_{OP}$ of the hardware circuit components of the servo control system. As a result, in a typical disk drive recording apparatus the gain difference of the hardware circuit components of the respective servo control system often degrades the servo control performance. In some cases this gain difference can even lead to malfunction of the servo control system.

Some techniques exist for calibration of disk drive servo control systems. For example, U.S. Pat. No. 4,480,217, entitled "Automatic Velocity Calibrator for a Velocity Servo Loop in a Magnetic Disk Drive" and granted to Robbins et al., shows a device for automatically calibrating actuator velocity in a disk drive. This system makes a series of measurements of the actuator velocity during normal seek operation of the disk drive, stores the measurements, and computes an average velocity value. This average approximates the instantaneous velocity of the actuator during one of these seek operations. The system then compares the average to the target velocity of a constant velocity command and increments or decrements a latch in accordance with the result. The latch value is then used to adjust the gain of the velocity transducer. This system therefore calibrates the actuator instantaneous velocity to a target velocity through a series of successive approximations.

Prior calibration approaches, such as that of Robbins et al., have certain benefits but do not provide a satisfactory level of true gain calibration. First, the Robbins system and similar systems calibrate velocity, not gain, and thus fail to recognize the important role that gain miscalibration can play in the actual performance characteristics of the disk drive. Second, the Robbins approach samples instantaneous velocity values during ongoing use of the disk drive and therefore does not take into account the substantial role that seek operations with relatively long stroke lengths play in performance degradation when the system has poorly calibrated gain. Third, these prior art systems tend to involve cumbersome computational schemes that fail to take advantage of the underlying system dynamics involved when gain miscalibration leads to performance degradation.

In view of the performance problems in servo control systems arising from miscalibration of hardware component gains and the limitations of existing calibration technology, I have found that a need exists for an improved gain calibration method and apparatus to be incorporated in high performance disk drives. Such an invention will reliably accomodate variations in hardware parameters between individual disk drive units, but it will also be capable of inexpensive and uniform implementation in a mass-produced disk drive product. Ideally, this gain calibration solution will be flexible to allow a wide variety of versions, yet sufficiently powerful to provide effective gain calibration in a wide range of hardware environments.

SUMMARY OF THE INVENTION

It is therefore an object of the present invention to provide an improved method and apparatus for, and a disk drive recording apparatus incorporating and improved function of, gain calibration.

It is a further object to provide such a method, apparatus, and disk drive capable of providing improved performance through calibration of the servo control system gain.

The above and other objects can be achieved according to the principles of the present invention incorporating a method and apparatus for gain calibration of a servo control system in a disk drive recording apparatus, and a disk drive recording apparatus incorporating such a gain calibration function. The disk drive recording apparatus typically includes at least one disk having a plurality of concentric tracks thereon, at least one head for writing and reading data to and from the disk, an actuator for moving the head in a horizontal direction on the disk. A reference velocity value is provided for the disk drive and may be stored in a memory. The reference velocity value is determined from a reference velocity obtained upon application of a maximum current to the actuator.

In a first aspect of the invention, a method gain calibration is provided comprising the step of generating a plurality of velocity measurements by measuring, for each one of a plurality of applications of a maximum current to an actuator of the disk drive, a moving velocity of the actuator for the application. A second step consists of generating an average velocity signal representative of an average of said plurality of velocity measurements. The method proceeds in a third step by generating a gain scaling signal representative of a gain scaling factor corresponding to the average and to the reference velocity value. A fourth step consists of generating a gain parameter signal representative of a gain parameter corresponding to a reciprocal value of the gain scaling factor.

In a second embodiment, the method includes a step of measuring a reference velocity attained by the actuator upon application of a maximum current to the actuator for a fixed time period in a power-on initialization procedure of the disk drive recording apparatus and storing the result thereof as a reference velocity value. A second step consists of performing a seek operation for a specified one of a plurality of concentric tracks on a disk of the disk drive. The method proceeds in a third step with generating a plurality of measured velocity values by applying, in each one of a predetermined number of iterations, a maximum current to the actuator and measuring a moving velocity thereby imparted to the actuator in that iteration.

In another aspect of the present invention, an apparatus is provided for gain calibration of a servo control system in a disk drive recording device. The apparatus includes a velocity averaging unit that receives a plurality of velocity measurements, computes an average of the velocity measurements, and generates an average velocity signal representative of the average. The plurality of velocity measurements is required to be generated by measuring, for each one of a plurality of applications of a maximum current to an actuator of the disk drive recording apparatus, a moving velocity imparted to the actuator by the application. A gain scaling unit receives the average velocity signal and, in response to it, generates a gain scaling signal representative of a gain scaling factor corresponding to the average and to a reference velocity value. A gain parameter unit receives the gain scaling signal and generates in response thereto a gain parameter signal representative of a gain parameter corresponding to a reciprocal value of the gain scaling factor. A calibration controller provides a control function for the velocity averaging unit, the gain scaling unit, and the gain parameter unit, including providing the plurality of velocity measurements to and receiving the average velocity signal from the velocity averaging unit; providing the average velocity signal to and receiving the gain scaling signal from the gain scaling unit, and providing the gain scaling signal to the gain parameter unit.

In a third aspect of the invention, a disk drive recording apparatus having a servo control system with a gain calibration function is provided that includes a head for reading data from and writing data to a disk, with the disk having at least one surface for recording data. An actuator is included for laterally moving the head adjacent to the disk surface in response to a current. An actuator driver is included that generates the current in response to a driver control signal. An amplifier receives data signals, including position data signals, from the head and generates from the data signals amplified data signals. A microprocessor is coupled to the amplifier and to the actuator driver. The microprocessor is adapted, by software or otherwise, to receive position error signals and generate from them a plurality of velocity measurements, calculate an average of the plurality of velocity measurements, calculate a gain scaling factor corresponding to the average and to a reference velocity value, and calculate a gain parameter corresponding to a reciprocal value of the gain scaling factor. The position error signals correspond to position data signals. Each one of the plurality of velocity measurements corresponds to a moving velocity imparted to the actuator by one of a plurality of applications of a maximum current to the actuator.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Hereinafter, the preferred embodiment of the present invention will be described in further detail with reference to the accompanying drawings, in which the various particulars including a flow chart for control, gain parameters, a scaling factor, etc. may be illustrated for better understanding of the present invention. However, it should be noted that the present invention shall not limited to those particulars set forth by way of an example only in the following embodiments. Further, a detailed description of known functions and structures, which may unnecessarily obscure an understanding of the subject matter of the invention, will be avoided in the present discussion.

Figure 1:
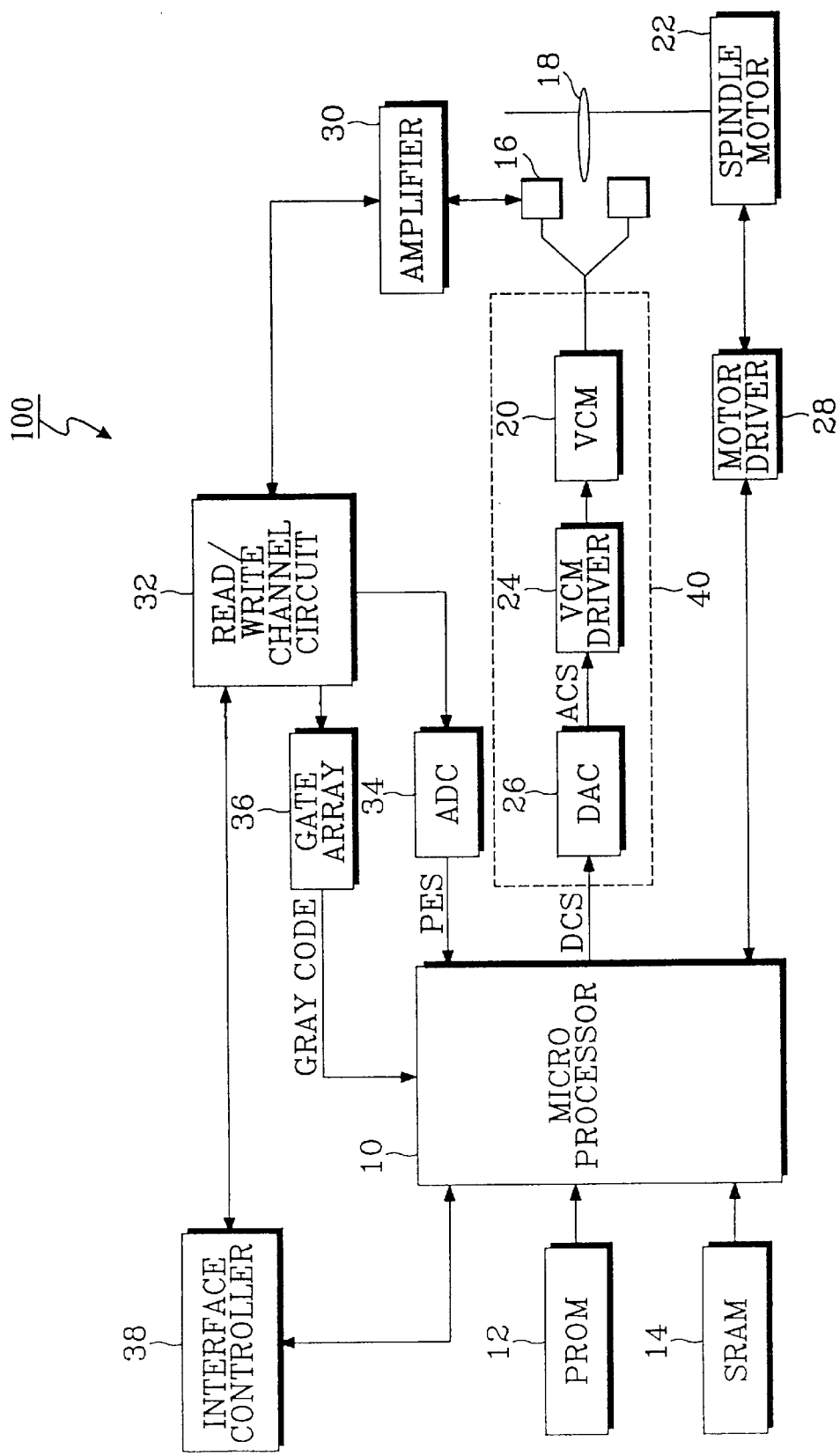
FIG. 1 is a block diagram illustrating a summarized construction of a disk drive recording apparatus incorporating the present invention.

A summarized construction of a disk drive recording apparatus is illustrated in a block diagram of FIG. 1, in which reference numeral 100 generally represents a hard disk drive incorporating the present invention. A brief description of this hard disk drive is provided hereinbelow to explain the environment of the invention; however, this brief and exemplary description is not intended to be limiting as to the particular arrangement of disk drive recording apparatuses as contemplated in the invention.

Referring now to FIG. 1, servo operation in hard disk drive 100 according to the present invention is controlled by a microprocessor 10, which is connected to a programmable read only memory (PROM) 12 and a static random access memory (SRAM) 14. PROM 12 includes a set of necessary basic operating software and servo control algorithm. A read/write head 16 undergoes lateral movement in a region adjacent to the surface of a recording medium, i.e., a disk 18, when reading and writing data at a target position on disk 18. A voice coil motor 20 is coupled to head 16, serving as an actuator for driving head 16 in a lateral direction over disk 18 during read/write operations. A voice coil motor driver 24 is coupled to voice coil motor 20 to control its operation. A spindle motor 22 is coupled to disk 18 for driving disk 18 on its central axis at a high speed of rotation.

A digital-to-analog converter (DAC) 26 receives a series of digital control signals DCS from microprocessor 10 and converts them into analog control signals ACS for input to voice coil motor driver 24. A component group comprising DAC 26, VCM driver 24, and VCM 20 is referred to collectively as plant 40 of the servo control system of disk drive 100. A motor driver 28 is coupled to spindle motor 22 to control its rotational operation under control of microprocessor 10. An amplifier 30 is connected to head 16 to amplify a read data signal retrieved from head 16 as well as a write data signal to be recorded onto disk 18, which enables appropriate signal amplitude levels to be maintained. An interface controller 38 serves as an interface to communicate various data with any peripheral circuits inclusive of a host computer (not shown) as well as with microprocessor 10.

A read/write channel circuit 32 is connected to amplifier 30 and to interface controller 38, and further is coupled to microprocessor 10 through a gate array 36 and an analog-to-digital converter (ADC) 34. Read/write channel circuit 32 receives write data from interface controller 38, under the control of microprocessor 10, and encodes the received write data according to a predetermined coding logic. Once it has encoded the data, read/write channel circuit 32 delivers the encoded data to amplifier 30. Further, read/write channel circuit 32 performs a kind of digital conversion of the analog read signal inputted from amplifier 30 to produce encoded read data (hereinafter referred to as ERD). ADC 34 receives an analog servo read signal from read/write channel circuit 32 and converts the received signal into a digital position error signal (PES) for input to microprocessor 10. Gate array circuit 36 is also receives the ERD signal from read/write channel circuit 32 and generates from it necessary servo information such as a gray code recorded in a servo region of the disk.

Figure 2:
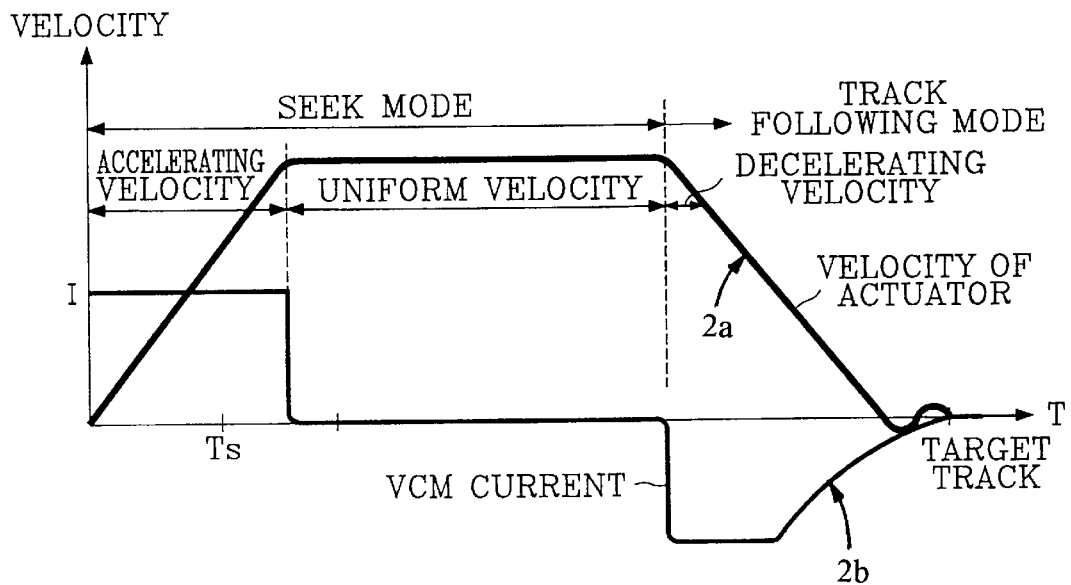
FIG. 2 is a characteristic graph diagram illustrating the current variation applied to a voice coil motor for a high-speed seek operation during the servo control and the velocity variation produced in an actuator according to the current variation.

Referring now to FIG. 2, there is shown an exemplary graph illustrating velocity variation pattern and the corresponding variation in current applied to voice coil motor 20 during servo control in the seek mode. When a host computer gives a data read/write instruction to microprocessor 10, a positional difference value indicating a distance for head 16 to move from a current track position to a target track position is received by microprocessor 10. A target velocity to move the head to the target track is then calculated by microprocessor 10, such as by reference to a kind of velocity table stored in PROM 12 or SRAM 14. Such a velocity table may have a series of velocity data for head 16, with each velocity value corresponding to a moving distance to the target track position.

The variation in velocity of VCM 20 and head 16 in response to velocity commands generated from the velocity table evolves as illustrated in FIG. 2. VCM 20 and head 16 move between tracks in the seek mode with an increasing velocity and a uniform velocity, in succession. They move to the target on-track position with a generally decreasing velocity in the track following mode. The bold line 2a of FIG. 2 represents this evolution as the system progresses through the seek mode and the track following mode. The direction and level of the current applied to VCM 20 are shown in the thin line 2b of FIG. 2.

DAC 26 converts a digital control signal DCS from microprocessor 10 to a corresponding analog control signal ACS in voltage form, which is delivered to VCM driver 24. In accordance with the ACS, VCM driver 24 generates a driving current I and applies I to VCM 20. This application of current to VCM 20 generates a torque and thereby imparts a velocity to VCM 20 and head 16.

The actual velocity thus imparted to an actuator such as VCM 20 depends on the gain differences exhibited by the various hardware components of the servo control system. Values P(s), representing positional variation of head 16 owing to the various gain differences of the hardware components in the servo control system and V(s), representing the velocity of the actuator, can be obtained from the following equations:

$$P(s)/I(s) = K_{OP}/S^2 \text{ (RAD/Bits)} \tag{1}$$

$$V(s) = K_{OP}/S * I(s) \tag{2}$$

In equations (1) and (2), $K_{OP}$ denotes a gain constant of plant 40 of the servo control system and takes its value as the product of the respective gains for DAC 26, VCM driver 24 and VCM 20. Thus, the velocity V(s) of the actuator would be the product of the respective gains of plant 40 and an integral value of the current I. If any gain differences exist for the hardware circuit components of the servo control system, then they influence the velocity of the actuator, by generating a velocity difference ΔV(t), according to the following equation:

$$Vnrm(t) + \Delta V(t) = (K_{OP\_nrm} + \Delta K_{OP}) * \int i(t)dt \tag{3}$$

Figure 3:
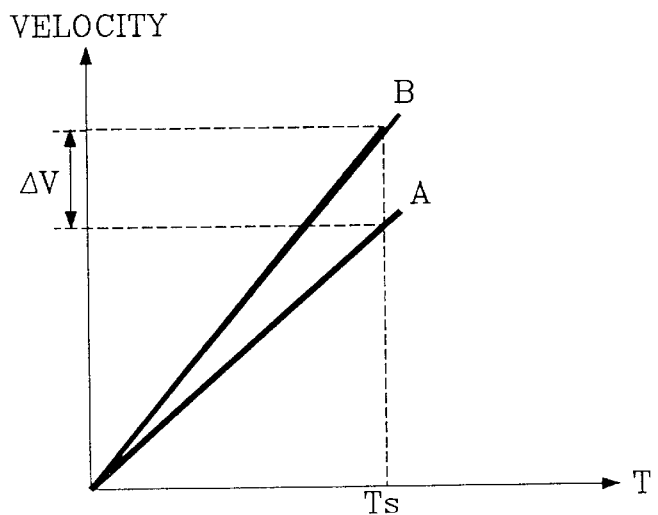
FIG. 3 is a characteristic graph diagram illustrating the velocity difference of an actuator generated by the gain of a servo control system according to a prior art disk drive recording apparatus.

Referring to FIG. 3, two characteristic graphs of the velocity variation illustrate the velocity difference of an actuator generated by the gain of a servo control system in a typical disk drive recording apparatus. In FIG. 3, straight line OA represents the variation of the velocity V nrm of the actuator in a normal state during the acceleration stage, and and straight line OB represents the velocity variation of the actuator due to a gain difference $\Delta K_{OP}$ arising from the hardware circuit components of plant 40.

Figure 4:
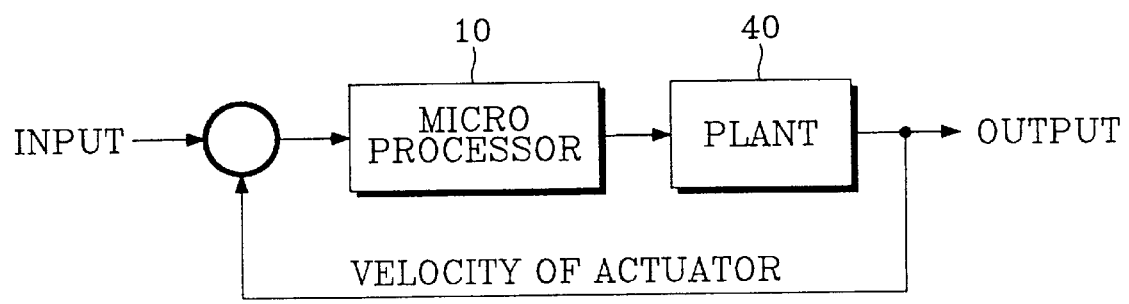
FIG. 4 is a schematic status diagram for a servo control system in a general disk drive recording apparatus.

FIG. 4 shows a schematic block diagram for a servo control system in a general disk drive recording apparatus incorporating the present invention. Microprocessor 10 receives a PES indicative of a positional difference between a target track and a current track for head 16. In accordance with the PES, microprocessor 10 generates a target velocity needed for positioning head 16 at the target track. Microprocessor 10 then provides control data for driving an actuator responsive to the above target velocity. Plant 40 moves head 16 laterally on the surface of disk 18 in accordance with the control data provided from microprocessor 10. At the same time, an output value of plant 40, representing the position of VCM 20, is detected and provided to microprocessor 10 as a feedback signal.

Figure 5:
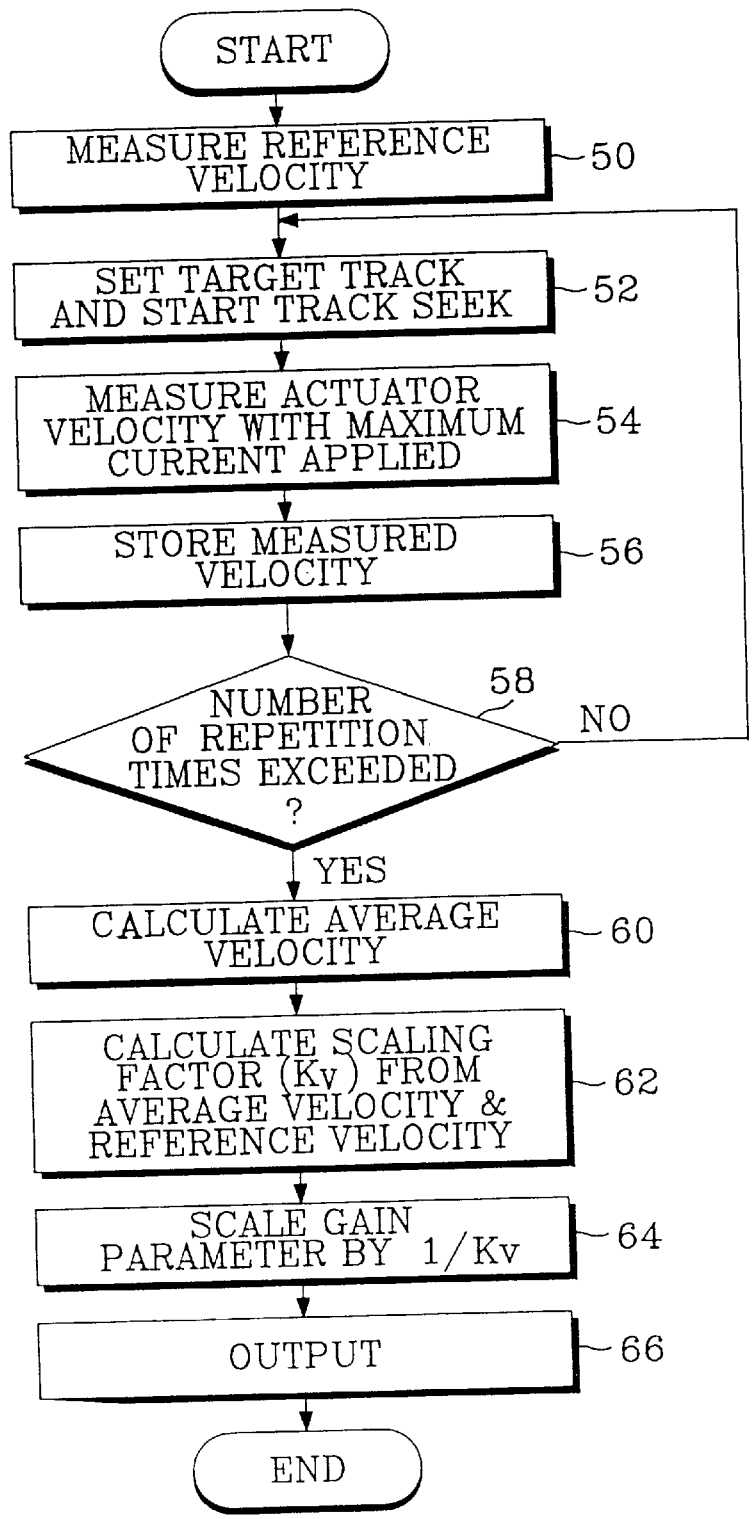
FIG. 5 is a flow chart illustrating the control sequence for gain calibration of a servo control system according to a preferred embodiment of the present invention.

FIG. 5 provides a flow chart illustrating a control sequence of microprocessor 10 for gain calibration according to a preferred embodiment of the present invention. The gain calibration sequence for the servo control system will now be described with reference to FIGS. 4 and 5. First, in order to obtain the gain difference $\Delta K_{OP}$, the various hardware circuit components in the servo control system, the moving velocity of an actuator, such as VCM 20, is measured in the design and manufacturing stages of a disk drive recording apparatus while applying a fixed amount of current to the actuator during a given time duration. Preferably, this fixed amount of current is a maximum current under which the hardware components are designed to operate. This measured velocity is then used as a reference velocity.

A moving velocity of the actuator is thereafter calculated from measurements for an actual assembled disk drive unit and is compared to the reference velocity. These manipulations produce a differential velocity, from which the gain difference of the particular disk drive unit can be calculated. In general, servo control for disk drive recording apparatus 100 is carried out through velocity control in the seek mode and through position control from a position adjacent to a target track. Hence, to provide for the in case where a seek operation crossing more than one third of the entire stroke area of disk 18 is required, microprocessor 10 provides an acceleration phase where the maximum current is applied to the VCM 20. This procedure induces the fastest servo control action within the operational design of the hardware. That is to say, in step 50 of FIG. 5 microprocessor 10 applies the maximum current to VCM 20 during a fixed time period Ts chosen for testing and measurement of the velocity of the actuator. The reference velocity induced by this application of current is then measured, and a reference velocity value is stored in SRAM 14.

Control then proceeds to step 52, where a target track is set up and the track seek operation starts. The target track is selected so that the track seek operation crosses for more than one third of the entire stroke area in disk 18. At step 54, microprocessor 10 controls VCM driver 24 to apply the maximum current to VCM 20 during an acceleration period, measured by Ts. A velocity measurement, corresponding to the velocity of VCM 20, is taken at the end of the period. At step 56 a measured velocity value corresponding to the velocity measurement is stored. Control proceeds to step 58, where it is determined whether the velocity measuring operation of step 54 has been performed more than a predetermined number of times. to obtain an average velocity of the actuator is exceeded. Thus, if the number of velocity measurements taken does not exceed the predetermined number of repetition times, then control returns to step 52 to repeat the sequence of steps 52, 54, and 56. On the other hand, if the number of velocity measurements does exceed the predetermined number, then control proceeds to step 60 where an average of the measured velocity values is calculated.

Microprocessor 10 calculates at step 62 a scaling factor Kv corresponding to the average and the reference velocity value. In a preferred operation, the scaling factor is computed by dividing the average by the reference velocity value. At step 64 the gain parameter of the servo control system is scaled by 1/Kv. Control proceeds to step 66, which provides a multiplication of the scaled gain parameter and an input signal fed back from plant 40. Consequently if the gain parameter is scaled by 1/Kv, then the output of microprocessor 10 is also scaled by 1/Kv and thereby can offset the gain difference Kv, which can be expressed as $Kv=(K_{OP\_nrm}+\Delta K_{OP})/(K_{OP\_nrm})$, for plant 40.

FIG. 6 illustrates an alternative embodiment of the present invention, which nevertheless operates in a maimer equivalent to the incorporation of the invention in disk drive 100. Apparatus 110 provides gain calibration for the servo control system of a disk drive recording apparatus (not shown) through the same basic functions as the procedure illustrated in the flow diagram of FIG. 5. FIG. 6 illustrates apparatus 110 as a device se A calibration controller 120 provides overall control of the gain calibration procedure, including mediating various signals between the other components of apparatus 110. In particular, calibration controller 120 provides the velocity measurements generated in step 54 of FIG. 5 to a velocity averaging unit 130, which computes the average as in step 60.

An average velocity signal representing the average is then returned to calibration controller 120, which retrieves the reference velocity value from a first memory 140 and provides the reference velocity value and the average to a gain scaling unit 150. The operation of gain scaling unit 150 includes calculating the scaling factor Kv, as indicated in step 62 of FIG. 5, and returning a gain scaling signal representative of the gain scaling factor to calibration controller 120. A gain parameter unit 160 receives the gain scaling factor from calibration controller 120 and generates a gain parameter signal representative of a gain parameter, in accordance with step 64.

Various options exist for implementation of apparatus 110. First, apparatus 10 may constitute a discrete device within the disk drive recording apparatus, in communication with but separate from microprocessor 10. Alternatively, all or part of the components of apparatus 110 may be implemented through software residing or running on microprocessor 10 and its associated hardware. A second memory 170 may be provided for storage of the measured velocity values, which may be a separate device dedicated to apparatus 110 or a portion of a general-purpose memory attached to microprocessor 10. A velocity measuring unit 180 may optionally be included as a part of apparatus 110, although preferrably apparatus 110 will utilize hardware and software already existing in the servo control system for measuring velocities.

If apparatus 110 forms a device separate from microprocessor 10, then calibration controller 120 may provide calibration control signals to microprocessor 10 to initiate the velocity measuring procedure of steps 52–58. Microprocessor 10 will then provide driver control signals to an actuator driver 190, such as VCM driver 24 in FIG. 1, which then generates the applications of the maximum current as in step 54. An actuator 200, such as VCM 20, responds to the maximum current as described previously. In yet another optional embodiment, calibration controller 120, velocity averaging unit 130, gain scaling unit 150, and gain parameter unit 160 may be implemented in a single hardware device, such as an integrated circuit device, separate from microprocessor 10. Alternatively, the functions of the various parts of apparatus 110 may be distributed between microprocessor 10 and one or more separate hardware devices.

As the foregoing description makes apparent, the present invention provides an improved method for gain calibration capable of achieving better performance and stability in servo control of a disk drive recording apparatus. These improvements are provided by the present invention through measurement and calibration of the gain of hardware circuit components of the servo control system.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of gain calibration for servo control in a disk drive recording apparatus, comprising the steps of:
   generating a plurality of velocity measurements in a predetermined period of time by measuring, for each one of a plurality of applications of a maximum current to an actuator of said apparatus, a moving velocity of said actuator for said application;
   generating an average velocity signal representative of an average of said plurality of velocity measurements;
   generating a gain scaling signal representative of a gain scaling factor corresponding to said average velocity signal and to a reference velocity value depending on said maximum current; and
   generating a gain parameter signal representative of a gain parameter corresponding to a reciprocal value of said gain scaling factor.

2. The method of claim 1, wherein said average velocity signal of said plurality of velocity measurements corresponds to a predetermined number of said velocity measurements.

3. The method of claim 2, wherein said average velocity signal generating step includes calculating a weighted sum of said predetermined number of said velocity measurements and dividing said weighted sum by a value corresponding to said predetermined number.

4. The method of claim 3, further comprising the step of performing a seek operation for a specified target track of a disk associated with said apparatus.

5. The method of claim 4, wherein said reference velocity value corresponds to a reference moving velocity attained by said actuator upon application of said maximum current thereto during a sample seek operation performed at a stage of manufacturing said apparatus.

6. The method of claim 5, wherein said specified target track is selected to provide said seek operation with an acceleration stage, a uniform velocity stage, and a deceleration stage during a velocity control mode.

7. The method of claim 1, wherein said gain parameter is equal to a product of said reciprocal value and a predetermined constant.

8. The method of claim 7, wherein said predetermined constant is one.

9. The method of claim 8, further comprising the step of performing a seek operation for a specified target track of a disk associated with said apparatus.

10. The method of claim 9, wherein said reference velocity value corresponds to a reference moving velocity attained by said actuator upon application of said maximum current thereto during a sample seek operation performed at a stage of manufacturing said apparatus.

11. The method of claim 10, wherein said specified target track is selected to provide said seek operation with an acceleration stage, a uniform velocity stage, and a deceleration stage during a velocity control mode.

12. The method of claim 11, wherein said seek operation includes crossing more than one third of an entire stroke area of said disk.

13. The method of claim 1, further comprising the step of performing a seek operation for a specified target track of a disk associated with said apparatus.

14. The method of claim 13, wherein said reference velocity value corresponds to a reference moving velocity attained by said actuator upon application of said maximum current thereto during a sample seek operation performed at a stage of manufacturing said apparatus.

15. The method of claim 14, wherein said specified target track is selected to provide said seek operation with an acceleration stage, a uniform velocity stage, and a deceleration stage during a velocity control mode.

16. The method of claim 15, wherein said seek operation includes crossing more than one third of an entire stroke area of said disk.

17. The method of claim 1, further comprised the step of storing in a memory said reference velocity value measured by applying said maximum current in a manufacturing procedure.

18. The method of claim 1, further comprised the step of dividing said average velocity signal by said reference velocity.

19. A method for gain calibration of a servo control system in a disk drive recording apparatus, with said apparatus including at least one disk having a plurality of concentric tracks thereon, a head for writing data to and reading data from said disk, and an actuator for moving said head in a lateral direction with respect to said disk, said method comprising the steps of:
   measuring a reference velocity attained by said actuator upon application of a maximum current to said actuator for a fixed time period in a power-on initialization procedure of said apparatus and storing a result thereof as a reference velocity value;
   performing a seek operation for a specified one of said plurality of concentric tracks;
   generating a plurality of measured velocity values by applying, in each one of a predetermined number of iterations in a predetermined period of time, said maximum current to said actuator and measuring a moving velocity thereby imparted to said actuator in said iteration;
   calculating an average moving velocity value corresponding to said plurality of measured velocity values when said plurality of measured velocity values is equal in number to said predetermined number of iterations;
   calculating a gain scaling factor corresponding to a gain difference associated with said average moving velocity value and said reference velocity value depending on said maximum current; and
   generating a gain parameter corresponding to a reciprocal value of said gain scaling factor.

20. The method of claim 19, further comprising the step of storing said plurality of measured velocity values in a memory.

21. The method of claim 20, wherein said step of calculating an average moving velocity value includes the step of calculating a weighted sum of said plurality of measured velocity values is equal in number to said predetermined number of iterations and dividing said weighted sum by a value corresponding to said predetermined number.

22. The method of claim 21, wherein each weight in said weighted sum equals one.

23. The method of claim 19, wherein said gain parameter is equal to a product of said reciprocal value and a predetermined constant.

24. The method of claim 23, wherein said predetermined constant is equal to one.

25. The method of claim 19, wherein said specified target track is selected to provide said seek operation with an acceleration stage, a uniform velocity stage, and a deceleration stage during a velocity control mode.

26. A disk drive recording apparatus having a servo control system with a gain calibration function, comprising:

a head for reading data from and writing data to a disk having at least one surface for recording data;

an actuator for laterally moving said head adjacent to said surface in response to a current;

an actuator driver for generating said current in response to a driver control signal;

an amplifier for receiving data signals, including position data signals, from said head and generating therefrom amplified data signals; and a microprocessor coupled to said amplifier and to said actuator driver and adapted to:

receive position error signals corresponding to said position data signals and generate therefrom a plurality of velocity measurements, with each one of said plurality of velocity measurements corresponding to a moving velocity imparted to said actuator by one of a plurality of applications of a maximum current to said actuator, calculate an average of said plurality of velocity measurements, calculate a gain scaling factor corresponding to said average and to a reference velocity value relating to said maximum current, and calculate a gain parameter corresponding to a reciprocal value of said gain scaling factor.

27. The disk drive recording apparatus of claim 26, further comprising a first memory for storing said reference velocity value which is measured by applying said maximum current to said actuator.

28. The disk drive recording apparatus of claim 27, wherein said reference velocity value corresponds to a reference velocity imparted to said actuator upon application of said maximum current during a sample seek operation performed during a stage of manufacturing said disk drive recording apparatus.

29. The disk drive recording apparatus of claim 26, further comprising a memory for storing said plurality of velocity measurements.

* * * * *